(12) United States Patent
Montero et al.

(10) Patent No.: US 9,697,717 B2
(45) Date of Patent: Jul. 4, 2017

(54) POWER ADAPTER WARNING SYSTEM

(71) Applicant: Dell Products L.P., Round Rock, TX (US)

(72) Inventors: Adolfo S. Montero, Pflugerville, TX (US); David C W Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/924,445

(22) Filed: Oct. 27, 2015

(65) Prior Publication Data

US 2017/0116840 A1    Apr. 27, 2017

(51) Int. Cl.
| G08B 21/00 | (2006.01) |
| G08B 21/18 | (2006.01) |
| G06F 1/28 | (2006.01) |
| G06F 1/32 | (2006.01) |

(52) U.S. Cl.
CPC .............. *G08B 21/18* (2013.01); *G06F 1/28* (2013.01); *G06F 1/3253* (2013.01); *G06F 1/3296* (2013.01)

(58) Field of Classification Search
CPC ......... G08B 21/18; G06F 1/28; G06F 1/3296; G06F 1/3253
USPC ....................................................... 340/654
See application file for complete search history.

(56) References Cited

U.S. PATENT DOCUMENTS

| 7,536,569 B2 | 5/2009 | Montero et al. |
| 9,317,092 B2* | 4/2016 | Tsai ..................... G06F 1/266 |
| 2010/0179394 A1* | 7/2010 | Sohn ..................... A61B 5/00 600/301 |
| 2012/0017101 A1* | 1/2012 | So ......................... G06F 1/266 713/300 |
| 2015/0253830 A1 | 9/2015 | Montero et al. |

* cited by examiner

*Primary Examiner* — Tanmay Shah
(74) *Attorney, Agent, or Firm* — Haynes and Boone, LLP (57) ABSTRACT

A power adapter warning system includes a computing device that has a display screen and that is coupled to a power adapter device and at least one peripheral device. The computing device initializes and, in response, detects the power adapter device. The computing device then determines that the power adapter device does not provide sufficient power to complete a boot process and, in response, prevents power from being provided to the peripheral device(s). The computing device then performs the boot process such that the display screen is available for displaying information, and provides a power adapter warning message for display on the display screen. The peripheral device(s) may be connected to the computing device via USB connectors, and power may be disabled to the USB connectors to allow the computing device to perform the boot process using power provided by the power adapter.

17 Claims, 5 Drawing Sheets

POWER ADAPTER WARNING SYSTEM

BACKGROUND

The present disclosure relates generally to information handling systems, and more particularly to providing user-friendly warnings for power adapters used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, mobile computing devices, utilize power adapters that couple the mobile computing systems to power sources and convert power from those power sources to a power level that is appropriate for use in operating the mobile computing system and/or charging the battery for the mobile computing system. Some different mobile computing systems may utilize power adapters that share the same power adapter connectors (which couple the power adapter to the mobile computing device), which can lead to issues with regard to operating the mobile computing devices. For example, some laptop/notebook computing devices utilize 65 watt power adapters (i.e., laptop/notebook computing devices that are designed to operate with 65 watts of power) with power adapter connectors that are also utilized on 40 W power adapters used with tablet computing devices (i.e., tablet computing devices that are designed to operate with 40 watts of power). In such cases, if the 40 W power adapter is used to power the laptop/notebook computing device, that power adapter will not be able to sufficiently power that laptop/notebook computing device. In conventional systems, the use of such insufficiently powered power adapters with mobile computing devices has been dealt with by disabling the power adapter and using battery power in the mobile computing device. However, in situations where there is not sufficient battery power to power the mobile computing device, the battery in the mobile computing device will not charge (i.e., due to the disabling of the power adapter used to charge it) and the mobile computing device will not operate (i.e., due to lack of power). Due to the inability of the mobile computing device to operate in such situations, the only option for alerting the user of the issue with the power adapter is via a light emitting diode (LED) power adapter error indication (e.g., an LED that blinks in a predetermined pattern) on the power adapter. However, users typically do not understand such LED error indications and, as such, situations like those above can lead to service calls and user dissatisfaction.

One conventional solution to the problems discussed above has been to throttle the processing system in the mobile computing device when an insufficiently powered power adapter is used to power the mobile computing device. In some conventional systems, the throttling of the processing system allows the power adapter to provide enough power to the mobile computing device to boot such that power adapter error warning can be displayed on a display device of the mobile computing device. However, power adapters are now being manufactured with power adapter connectors that connect to a wider range of mobile computing devices with a wider range of power requirements, and many mobile computing devices are pushing power requirements ever higher. As such, many opportunities exist for a severely underpowered power adapter to be used with a relatively high power requirement mobile computing device, and such opportunities will result in the inability of the mobile computing device to boot to allow a power adapter error warning to be displayed on the display device of the mobile computing device. In such situations, the only option for alerting the user of the issue with the power adapter is via LED power adapter error indications, which suffer from the deficiencies discussed above.

Accordingly, it would be desirable to provide an improved power adapter warning system.

SUMMARY

According to one embodiment, an Information Handling System (IHS) includes at least one peripheral device connector that is configured to couple to at least one peripheral device; a power adapter connector that is configured to couple to a power adapter device; a processing system coupled to each of the at least one peripheral device connector and the power adapter connector; and a memory system that includes instructions that, when executed by the processing system, cause the processing system to provide a power adapter warning engine that is configured to: initialize and, in response, detect the power adapter device coupled to the power adapter connector; determine that the power adapter device does not provide sufficient power to complete a boot process and, in response, prevent power from being provided to the at least one peripheral device connector; perform the boot process such that a display device is available for displaying information; and provide a power adapter warning message for display on the display device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
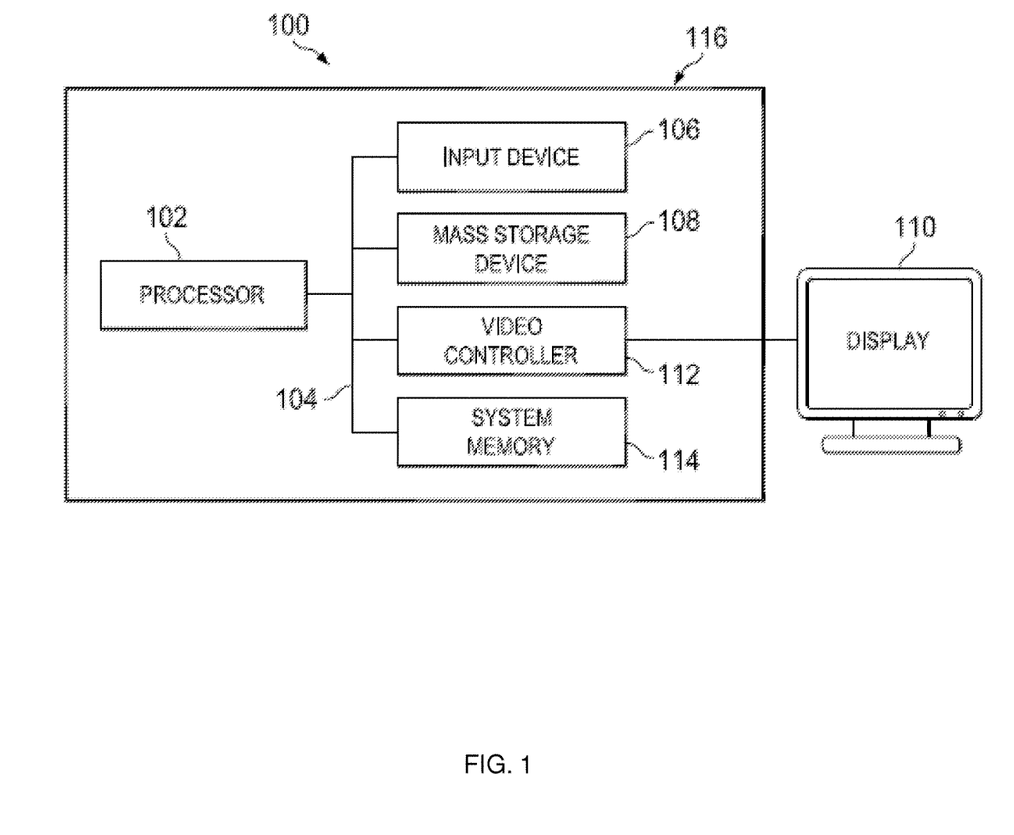
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
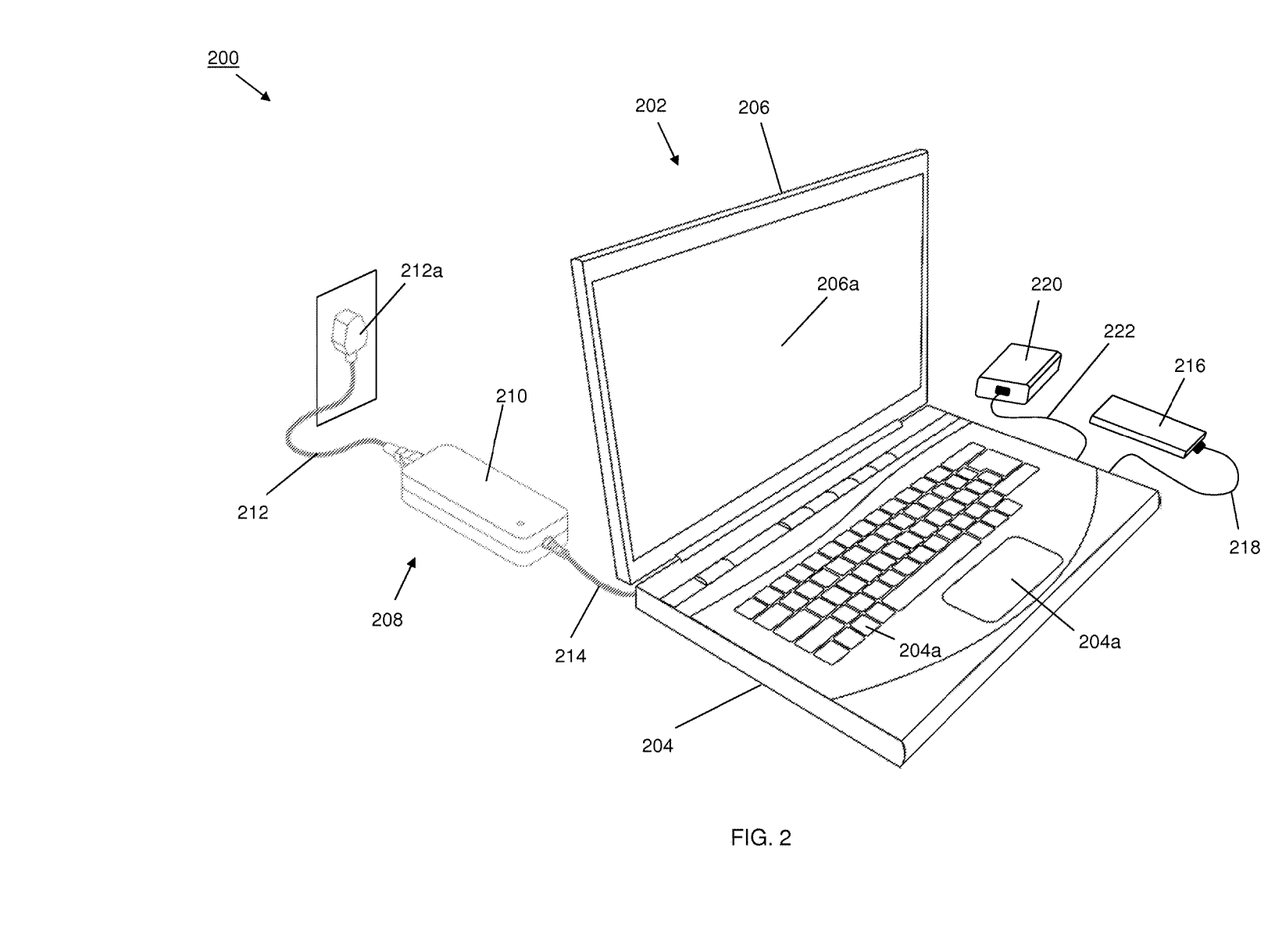
FIG. 2 is a perspective view illustrating an embodiment of a power adapter warning system.

Referring now to FIG. 2, an embodiment of a power adapter warning system 200 is illustrated. The power adapter warning system 200 includes a computing device 202 that may be the IHS 100 discussed above with reference to FIG. 1 and/or that may include some or all of the components of the IHS 100. In the illustrated embodiment the computing device 202 is a mobile computing device that is illustrated as a laptop/notebook computer. However, the computing device 202 may be a variety of computing devices including non-mobile computing devices (e.g., desktop computing devices, servers, storage systems, switches, etc.) and/or different types of mobile computing devices (e.g., tablet computing devices, mobile phones, etc.) In the illustrated embodiment, the computing device 202 includes a base 204 that includes input devices 204a and that is moveably coupled to a display device 206 that includes a display screen 206a. In a specific embodiment, the computing device 202 may be a convertible notebook/tablet computing device with the display device 206 configured to move from the orientation illustrated in FIG. 2 (a "notebook orientation") to an orientation in which the display device has been rotated about its moveable coupling to the base 202 such that the display screen 206a faces a direct that is opposite the base 204 from the input devices 204a (a "tablet orientation").

The power adapter warning system 200 also includes a power adapter device 208. The power adapter device 208 includes a power adapter device base 210 that is coupled to a power source cable 212 having a power source connector 212a that is configured to couple to a power source (e.g., through the wall outlet in the illustrated embodiment). The power adapter device 208 also includes a computing device cable 214 that includes a computing device connector (not illustrated in FIG. 2) that is configured to couple to the computing device 202. The power adapter device base 210 may include a variety of power conversion components and other components that are configured to receive power from the power source through the power source cable 212, convert that power to a power level that is required for the computing device for which it is designed, and provide that power at that power level to the computing device through the computing device cord 214. In the embodiments discussed below, the power adapter device 208 is designed (e.g., configured to provide power at a maximum power level) for a computing device (e.g., a tablet computing device) that requires less power than the computing device 202 (e.g., a laptop/notebook computing device), but any type of computing device and underpowered power adapter device will benefit from the teachings of the present disclosure and thus are envisioned as falling within its scope.

The power adapter warning system 200 also includes a plurality of peripheral devices coupled to the computing device 202, which in the illustrated embodiment include a mobile phone 216 that is coupled to the computing device 202 by a mobile phone cable 218 that is connected to a peripheral device connector (not illustrated) on the computing device 202, and an external hard drive 220 that is coupled to the computing device 202 by a external hard drive cable 222 that is connected to a peripheral device connector (not illustrated) on the computing device 202. In the embodiments discussed below, the peripheral device connectors on the computing device 202 are discussed as Universal Serial Bus (USB) connectors that are configured to transmit power and data to the peripheral devices. However, other peripheral devices such as different types of storage devices (e.g., a USB key, other USB peripheral devices, etc.), Firewire peripheral devices, Thunderbolt peripheral devices, next-generation USB Type-C peripheral devices, and/or a variety of other peripheral devices known in the art may be coupled to other peripheral device connectors on the computing device 202 (e.g., Firewire connectors, Thunderbolt connectors, Power over Ethernet connectors, and/or a variety of other peripheral device connectors known in the art while remaining within the scope of the present disclosure.

Figure 3:
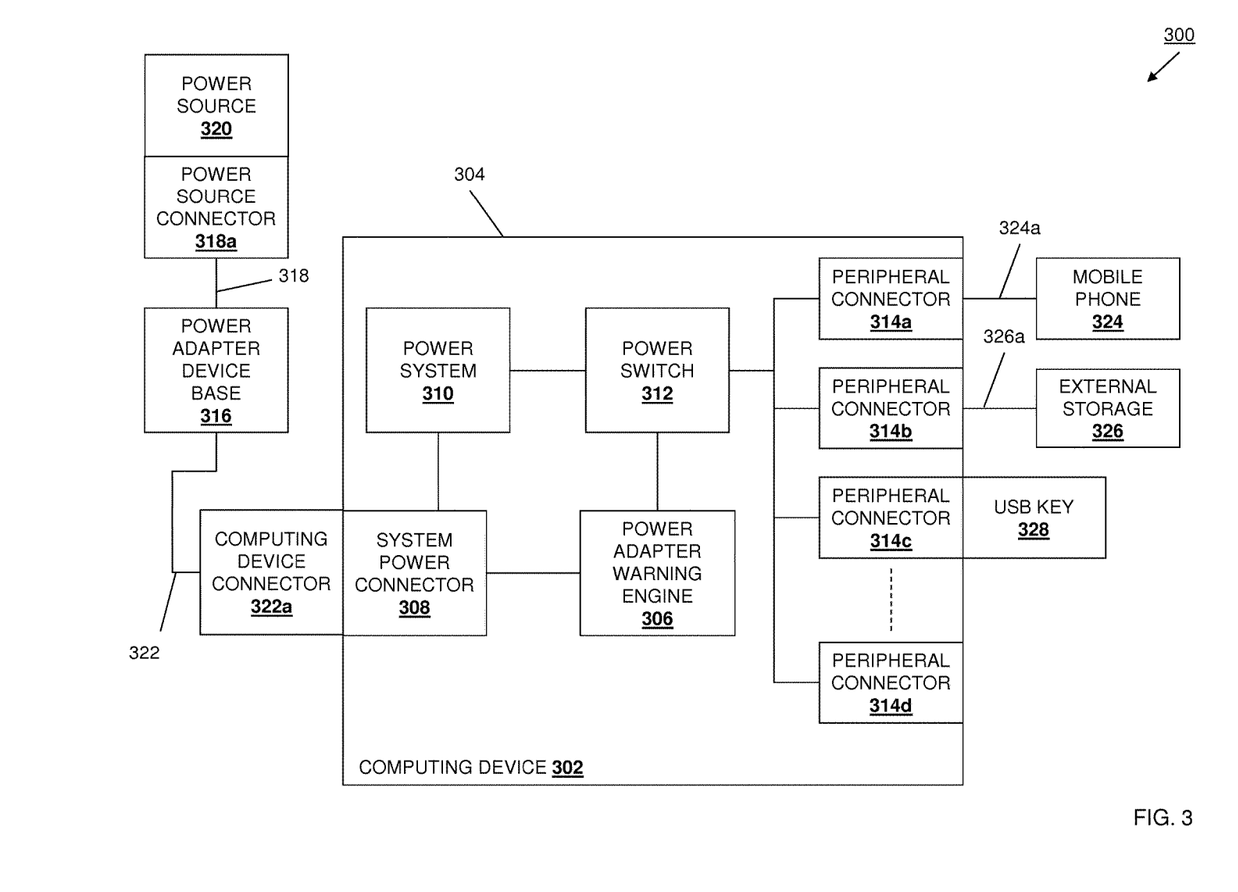
FIG. 3 is a schematic view illustrating an embodiment of the power adapter warning system of FIG. 2.

Referring now to FIG. 3, an embodiment of a power adapter warning system 300 is illustrated. In an embodiment, the power adapter warning system 300 may be the power adapter warning system 200 discussed above with reference to FIG. 2. The power adapter warning system 300 includes a computing device 302 that may be the computing device 202 discussed above with reference to FIG. 2 and, as such, may be the IHS 100 discussed above with reference to FIG. 1 and/or may include some or all of the components of the IHS 100. The computing device 302 includes a chassis 304 that houses the components of the computing device 302, only some of which are illustrated in FIG. 3. In an embodiment, the chassis 304 houses a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an power adapter warning engine 306 that is configured to perform the functions of the power adapter warning engines and computing devices discussed below. In a specific embodiment, the power adapter warning engine 306 may be provided by an embedded controller in the computing device 302, although other control subsystems are envisioned as falling within the scope of the present disclosure.

The chassis 304 also houses a system power connector 308 that may be accessible on an outer surface of the chassis 304 and that is coupled to the power adapter warning engine 306 (e.g., via a coupling between the processing system and the system power connector 308.) The chassis 304 also houses a power system 310 that is coupled to the system power connector 308 and configured to provide power received from the system power connector 308 to components of the computing device 302. The chassis 304 also houses a power switch 312 that is coupled to the power system 310 and the power adapter warning engine 306 (e.g., via a coupling between the processing system and the power switch 312). The chassis 304 also houses a plurality of peripheral device connectors 314*a*, 314*b*, 314*c*, and up to 314*d* that are coupled to the power switch 312. In the embodiments discussed below, the peripheral device connectors 214*a-d* are discussed as USB connectors that are configured to transmit power and data to peripheral devices, but in other embodiment may be other peripheral device connectors (e.g., Firewire connectors, Thunderbolt connectors, Power over Ethernet connectors, and/or a variety of other peripheral device connectors known in the art) while remaining within the scope of the present disclosure. In the embodiments discussed below, the power switch 312 is described as a hardware switch that may be activated and/or deactivated to allow and prevent power from the power system 310 from reaching the peripheral device connectors 314*a-d*. However, one of skill in the art in possession of the present disclosure will recognize that other hardware and/or software subsystems may be utilized to allow and prevent power to single peripheral device connectors 314*a-d* and/or different subsets of the peripheral device connectors 314*a-d* while remaining within the scope of the present disclosure.

The power adapter warning system 300 also includes a power adapter device that may be the power adapter device 208 discussed above with reference to FIG. 2. The power adapter device on the power adapter warning system 300 includes a power adapter device base 316 that is coupled to a power source cable 318 having a power source connector 318*a* that is coupled to a power source 320 (e.g., through the wall outlet illustrated in FIG. 2). The power adapter device on the power adapter warning system 300 also includes a computing device cable 322 that includes a computing device connector 322*a* that is coupled to the system power connector 308 on the computing device 302. As discussed above, the power adapter device base 316 may include a variety of power conversion components and other components that are configured to receive power from the power source 320 through the power source cable 318, convert that power to a power level that is required for the computing device for which it is designed, and provide that power at that power level to the computing device through the computing device cable 322. In the embodiments discussed below, the power adapter device in the power adapter warning system 300 is designed (e.g., configured to provide power at a maximum power level) for a computing device (e.g., a tablet computing device) that requires less power than the computing device 302 (e.g., a laptop/notebook computing device), but any type of computing device and underpowered power adapter device will benefit from the teachings of the present disclosure and thus are envisioned as falling within its scope.

The power adapter warning system 300 also includes a plurality of peripheral devices coupled to the computing device 302, which in the illustrated embodiment include a mobile phone 324 that is coupled to the peripheral device connector 314*a* on the computing device 202 by a mobile phone cable 324*a*, an external storage device 326 that is coupled to the peripheral device connector 314*b* on the computing device 202 by a external storage device cable 326*a*, and a USB key 328 that is coupled to the peripheral device connector 314*c*. In the embodiments discussed below, the peripheral device connectors 314*a-c* on the computing device 202 are discussed as USB connectors that are configured to transmit power and data to the mobile phone 324, the external storage device 326, and the USB key 328. However, other peripheral devices such as different types of devices (e.g., a USB key, other USB peripheral devices, etc.), Firewire peripheral devices, Thunderbolt peripheral devices, next-generation USB Type-C peripheral devices, and/or a variety of other peripheral devices known in the art may be coupled to other peripheral device connectors 314*a-d* on the computing device 202 while remaining within the scope of the present disclosure.

Figure 4:
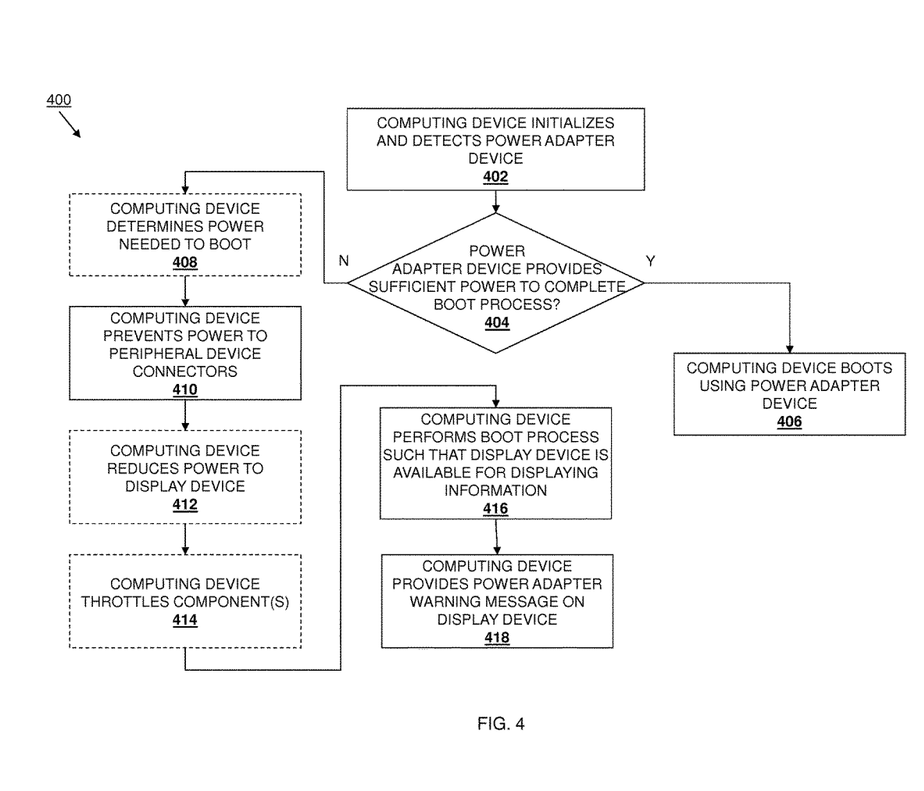
FIG. 4 is a flow chart illustrating an embodiment of a method for providing a power adapter warning.

Referring now to FIG. 4, an embodiment of a method 400 for providing power adapters warnings is illustrated. As discussed below, the power adapter warning system of the present disclosure includes a computing device that detects when it has been connected to a power adapter device that does not provide sufficient power such that the computing device may complete a boot process at least to a point where a display device on the computing device is available to display information. As detailed above, in such a situation, the computing device will not be able to complete the boot process and the only means for informing a user that the failure to boot is due to the insufficient power from the power adapter device is via a blinking LED on the power adapter device that the user may not understand. However, in response to determining that the power adapter device that does not provide sufficient power such that the computing device may complete a boot process at least to a point where a display device on the computing device is available to display information, the computing device of the power adapter warning system may instead prevent power from being provided to at least one peripheral device such that there is sufficient power to complete the boot process the point where a display device on the computing device is available to display information, perform the boot process, and provide a power adapter warning message for display on the display device so that the user is aware that the failure to boot is due to the insufficient power from the power adapter (i.e., the user is using the wrong power adapter for the computing device). In addition, in some embodiments, the computing device may determine and perform other power consumption reduction actions (e.g., reducing power to the display device, throttling components in the computing device, etc.) if the computing device determines that those power consumption reduction actions are needed or will otherwise allow the computing device to complete the boot process the point where a display device on the computing device is available to display information so that the power adapter warning message can be displayed. In the embodiments discussed below, references will be made to the components of both the power adapter warning systems 200 and 300 discussed in FIGS. 2 and 3 in order to describe one or more embodiments of the method 400.

The method 400 begins at block 402 where the computing device initializes and detects a power adapter device. In an embodiment, the power adapter device 208 is connected to the computing device 202 by, for example, coupling the power source connector 318a to the power source 320 and the computing device connector 322a to the system power connector 308 on the computing device 302. The connection of the power adapter device 208 to the computing device 202 will provides some level of power from the power source 320 to the computing device 302 (e.g., via the components in the power adapter device base 316) depending on the design of the power adapter device 208. That power is received at the system power connector 308 and provided to the power system 310, and the power system 310 may distribute that power to components in the computing device 302. At block 402, the power system 310 may distribute that power to the power adapter warning engine 306 (e.g., a processing system, an embedded controller or other control subsystem, etc.) and/or as other components of the computing device (e.g., a central processing unit, a Basic Input/Output System (BIOS), etc.) such that the computing device 302 may initialize in response to a power up, reset, reboot, and/or other initialization operation known in the art. As such, during the initialization of the computing device 302, the power adapter warning engine 306 is powered such that it may detect the connection of the power adapter device 208 (e.g., via the connection of the system power connector 308 and the computing device connector 322a).

The method 400 then proceeds to decision block 404 where the computing device determines whether the power adapter device provides sufficient power to complete a boot process. In an embodiment, the power adapter warning engine 306 may include one or more required power levels for the computing device 302 (e.g., the power adapter warning engine 306 may be programmed with a power adapter device minimum power rating needed for operation of the computing device 302, a power level needed for the computing device 302 to complete a boot process to a disk operating system (e.g., the MICROSOFT® Disk Operating System (MS-DOS), a power level needed for the computing device 302 to complete a boot process to a runtime operating system (e.g., the MICROSOFT® WINDOWS® operating system), and/or a variety of other power levels known in the art. At decision block 404, the power adapter warning engine 306 may communicate with the power adapter device 208 through the connection of the system power connector 308 and the computing device connector 322a to retrieve power level information stored in the power adapter device base 316 that is indicative of a power level provided by the power adapter device 208 (e.g., a maximum power rating, a minimum power rating, an average power rating, etc.) The power adapter warning engine 306 may then compare that power level information to the required power levels for the computing device 302 to determine whether the power adapter device provides sufficient power to complete the boot process at decision block 404.

If, at decision block 404, the computing device determines that the power adapter device provides sufficient power to complete the boot process, the method 400 proceeds to block 406 where the computing device boots using the power adapter. For example, at decision block 404, the power adapter warning engine 306 may determine that the power rating from the power adapter device 208 provides sufficient power to complete the boot process and, in response, perform the boot process using power from the power adapter device 208 such that the computing system 302 provides a runtime operating system for use by a user. In another example, at decision block 404, the power adapter warning engine 306 may determine that some other identifier (e.g., a model number, a serial number, and/or other power adapter device identifier) from the power adapter device 208 indicates that the power adapter device 208 provides sufficient power to complete the boot process (e.g., the power adapter device 208 is a model that is compatible with and/or designed to provide power needed by the computing device 302) and, in response, perform the boot process using the power adapter device 208 such that the computing system 302 provides a runtime operating system for use by a user. As such, if the power adapter device 208 is designed for or capable of providing power to the computing device 302 and configured to provide sufficient power to complete the boot process (as well as operate the computing device during runtime operations), the computing device 302 will boot using the power adapter device 208 and the method 400 ends.

If, at decision block 404, the computing device determines that the power adapter device does not provide sufficient power to complete the boot process, the method 400 may proceed to optional block 408 where the computing device determines a power needed to complete at least a portion of a boot process. For example, at decision block 404, the power adapter warning engine 306 may determine that the power rating from the power adapter device 208 does not provides sufficient power to complete the boot process and, in response, proceed to optional block 408 (or block 410). In another example, at decision block 404, the power adapter warning engine 306 may determine that some other identifier (e.g., a model number, a serial number, and/or other power adapter device identifier) from the power adapter device 208 indicates that the power adapter device 208 may not provides sufficient power to complete the boot process (e.g., the power adapter device 208 is a model that is not compatible with and/or designed to provide power needed by the computing device 302) and, in response, proceed to optional block 408 (or block 410). As such, if the power adapter device 208 is not designed for providing power needed by the computing device 302 and cannot (or may not) provide sufficient power to complete the boot process (as well as operate the computing device during runtime operations), the computing device 302 will proceed to optional block 408 (or block 410).

In an embodiment of optional block 408, the power adapter warning engine 306 may determine a power amount, power level, and/or other power characteristic needed to perform at least a portion of a boot process. For example, the power adapter warning engine 306 may retrieve a known power amount needed to boot the computing system 302 such that the display device 206 is available to display information (e.g., a power amount needed without any peripheral devices drawing power from the computing device 302). In another example, the power adapter warning engine 306 may detect any peripheral devices (e.g., the mobile phone 324, the external storage device 326, and/or the USB key 328) coupled to the computing system 302, and/or any other power-drawing subsystems that the computing device is currently configured to provide power received through the power adapter device 208 to (e.g., that may not be considered in the known power amount needed to boot the computing device 302 without any peripheral devices drawing power from the computing device 302), and determine an amount of power that may be provided to those peripheral devices or other subsystems while the computing device 302 boots such that the display device 206 is available to display information. While a few examples have been provided, at optional block 408 the power adapter warning engine 306 may receive, retrieve, or otherwise determine any power information needed to determine whether the power available from the power adapter device 208 is sufficient to complete a boot process that will result in the display device 206 being available to display information while remaining within the scope of the present disclosure. In some embodiments of optional block 408, the power adapter warning engine 306 may determine the power needed to boot to a disk operating system that allows the display device 206 to display information, while in other embodiments, the power adapter warning engine 306 may determine the power needed to boot to a runtime operation system that allows the display device 206 to display information. However, other levels of booting that may allow the display device 206 to display information will fall within the scope of the present disclosure as well.

Following option block 408, or in response to determining that the power adapter device does not provide sufficient power to complete the boot process at decision block 404, the method 400 proceeds to block 410 where the computing device prevents power from being provided to the peripheral device connectors. In an embodiment, the power adapter warning engine 306 may deactivate the power switch 312 such that power from the power system 310 (received through the power adapter device 208) is not provided to the peripheral device connectors 314a-d. As such, the power adapter warning engine 306 may completely shut off power to all the peripheral device connectors 314a-d such that the power received through the power adapter device 208 is sufficient to perform the boot process in order for the display device 206 to display information. In some examples, block 410 may be performed without optional block 408 such that power to the peripheral device connectors 314a-d is shut off whenever a power adapter device is connected to the computing device 302 that provides insufficient power to complete at least a portion of the boot process in order to allow the display device 206 to display information. In other examples, block 410 may be performed following a determination at optional block 408 that the power needed to complete the boot process in order for the display device 206 to display information will only be available (from the power adapter device 208) if the power to the peripheral device connectors 314a-d is shut off. Furthermore, in some examples, power may only be shut off to some of the peripheral device connectors 314a-d, either without optional block 408 or in response to determining at optional block 408 that those peripheral device connectors must be shut off if the computing device 302 is to be booted using the power adapter device 208. In yet other examples, the power adapter warning engine 306 may communicate with the peripheral devices (e.g., the external storage device 326 and/or the USB key 328) to determine whether any boot critical information (e.g., an operating system) is included on those peripheral device(s) and/or is to be used by the computing device 302 to boot and, in response, prevent power from being shut off to the peripheral device connector connected to that peripheral device at block 410 such that the computing device 302 may utilize that boot critical information to perform the boot process so that the display device 206 is available to display information.

Following block 410, the method 400 may proceed to optional block 412 where the computing device reduces power provided to the display device. In an embodiment, the power adapter warning engine 306 may cause the power system 310 to reduce the power provided to the display device 206 by, for example, sending an instruction to the power system 310 to modified the operation of the backlight for the display screen 206a in the display device 206. As such, the power adapter warning engine 306 may cause the backlight for the display screen 206a to be minimized such that the power received through the power adapter device 208 is sufficient to perform the boot process in order for the display device 206 to display information. In some examples, optional block 412 may be performed without optional block 408 such that power to the display device 206 is reduced whenever a power adapter device is connected to the computing device 302 that provides insufficient power to complete the boot process in order to allow the display device 206 to display information. In other examples, optional block 412 may be performed following a determination at optional block 408 that the power needed to complete the boot process in order for the display device 206 to display information will only be available (from the power adapter device 208) if the power to the display device 206 is reduced. Furthermore, in some examples, the backlight for the display screen 206a may be reduced some level rather than minimized, either without optional block 408 or in response to determining at optional block 408 that the non-minimizing reduction of the backlight for the display screen 206a is needed if the computing device 302 is to be booted using the power adapter device 208.

Following optional block 412, or block 410 when optional block 412 is skipped, the method 400 may proceed to optional block 414 where the computing device throttles components. In an embodiment, the power adapter warning engine 306 may throttle components in the computing device 302 by, for example, sending an instruction to throttle (e.g., reduce the operation/operating level of) the processing system (e.g., by asserting the PROCHOT pin on the processor), the memory system (e.g., by asserting the MEMHOT pin on the memory system), and/or other components in the computing device 302. As such, the power adapter warning engine 306 may throttle one or more components in the computing device 302 such that the power received through the power adapter device 208 is sufficient to perform the boot process in order for the display device 206 to display information. In some examples, optional block 414 may be performed without optional block 408 such that component(s) in the computing system are throttled whenever a power adapter device is connected to the computing device 302 that provides insufficient power to complete the boot process in order to allow the display device 206 to display information. In other examples, optional block 414 may be performed following a determination at optional block 408 that the power needed to complete the boot process in order for the display device 206 to display information will only be available (from the power adapter device 208) if one or more components in the computing device 302 are throttled. Furthermore, in some examples, particular components in the computing device 302 (e.g., the processing system) may be throttled, either without optional block 408 or in response to determining at optional 408 that the throttling of those components is needed if the computing device 302 is to be booted using the power adapter device 208.

The method 400 then proceeds to block 416 where the computing device performs a boot process such that the display device is available for displaying information. In an embodiment, subsequent to performing block 410 (and in some embodiments, optional blocks 412 and/or 414), the power adapter warning engine 306 may send an instruction to booting subsystems (e.g., a central processing unit, a BIOS, etc.) in the computing device 302 to perform a boot process, and at block 416, those booting subsystems may perform that boot process such that the display device 206 is available to display information. For example, the booting subsystems in the computing device 302 may perform the boot process such that the disk operating system is loaded and the display device 206 is available to display information in a disk operating system environment. In another example, the booting subsystems in the computing device 302 may perform the boot process such that the runtime operating system is loaded and the display device 206 is available to display information in a runtime operating system environment. However, as discussed above, other levels of booting may allow the display device to display information and are envisioned as falling within the scope of the present disclosure.

Figure 5:
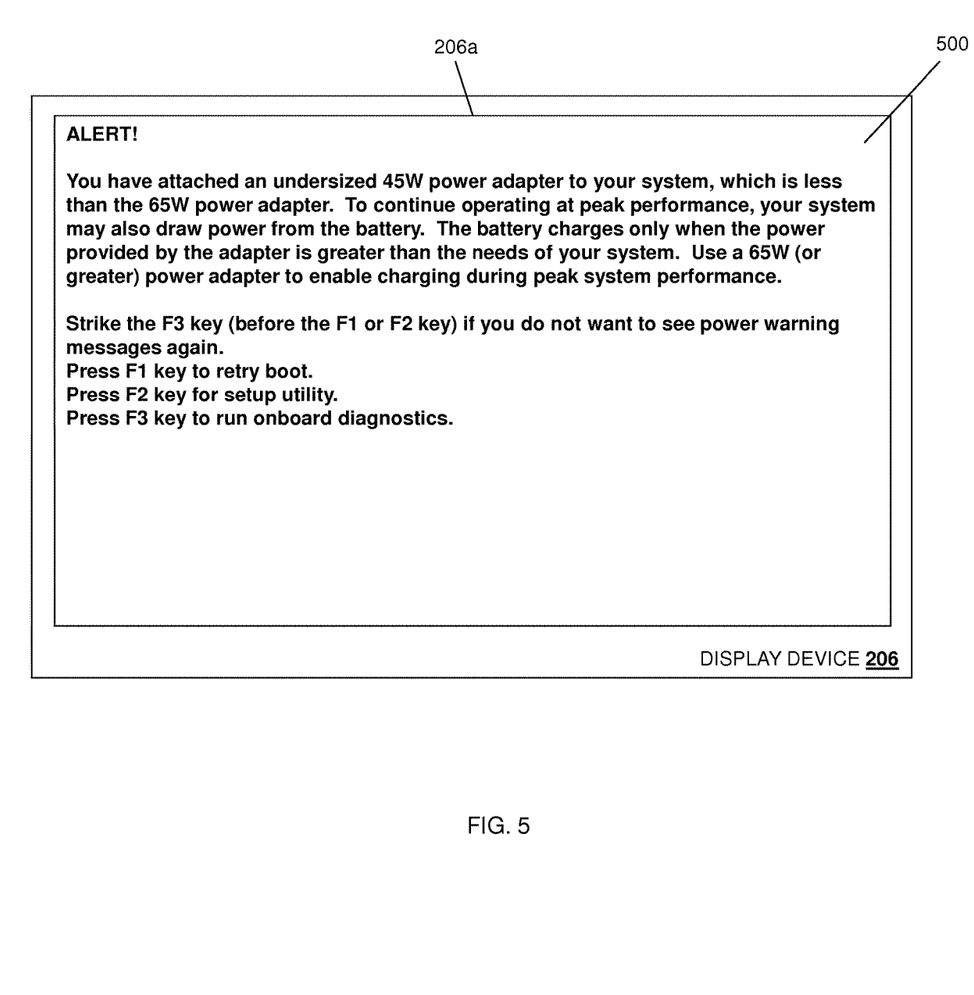
FIG. 5 is a screen shot illustrating an embodiment of a power adapter warning screen.

The method 400 may then proceed to block 418 where the computing device provides a power adapter warning message on the display device. In an embodiment, the power adapter warning engine 306 may provide an instruction to display a power adapter warning message on the display screen 206a of the display device 206 that informs the user of the computing device 302 that the power adapter device 208 connected to that computing device 302 is an incorrect power adapter device, provides insufficient power to power the computing device, and/or otherwise should be replaced in order for the computing device 302 to operate properly. For example, FIG. 5 illustrates a power adapter warning message screen 500 that may be displayed on the display screen 206a of the display device 206 when the computing device 302 is in a disk operating system environment provided the disk operating system following the boot process in block 416. The power adapter warning message screen 500 displays a power adapter warning message that informs the user of the computing device 302 that the power adapter 208 connected to the computing device 302 is not the correct power adapter device for that computing device 302 (e.g., it is a 45 watt power adapter device and the computing device requires a 65 watt power adapter device to operate properly), that use of that power adapter device 208 will cause the battery in the computing device 302 to be depleted, and that the power adapter device 208 should be replaced with a power adapter device designed to provide the correct amount of power to the computing device 302. The power adapter warning message screen 500 also provides instructions to the user of the computing device 302 to provide inputs to cancel the power adapter warning message and not show it again, as well as to reboot, run a setup utility, and run diagnostics.

While a specific example has been provided, one of skill in the art in possession of the present disclosure will recognize that the power adapter warning message provided at block 418 may provide a variety of information to inform the user of the computing device 302 of issues with the power adapter device 208. Furthermore, power adapter warning messages provided in a runtime operating system environment provided by a runtime operating system (rather than the disk operating system environment illustrated) may provide graphics, graphical user interfaces, Internet links, and/or other information to inform the user of the issues with the power adapter device 208, direct the user to a proper power adapter device, allow the user to purchase/order a proper power adapter device, locate a proper power adapter device in a computing device component inventory, and/or any other remedial measures that will allow the user of the computing device 302 to obtain or utilize the proper power adapter device for the computing system 302. The provisioning of such runtime operating system environment power adapter warning messages may be complicated when the processing system of the computing device 302 is throttled (e.g., at optional block 414) and the runtime operating system cannot be provided in a manner that allows for that functionality discussed above (e.g., the operation in the runtime operating system environment is too slow due to processing system throttling), but in some scenarios, the disabling of power to the peripheral component connectors 314a-d at block 410 and possibly the reduction of power to the display screen at optional block 412 may allow that runtime operating system to be provided (e.g., without throttling of the processing system) and the functionality discussed above to be realized.

Thus, systems and methods have been described that detect when incorrect/underpowered power adapter devices will be unable to provide power sufficient to complete a boot process to a point where a display device on a computing device is available to display information. Rather than informing a user of the failure via a blinking LED on the power adapter device the system will instead prevent power from being provided to non-boot-critical external loads such that there is sufficient power to complete the boot process to a point where a display device on the computing device is available to display information, perform the boot process, and provide a message on the display device that informs the user that the power adapter device underpowered or otherwise not the proper power adapter device. While in many situations, the preventing of power from being supplied to the non-boot-critical external loads will result in the power from the underpowered power adapter device to complete the boot process to a point where the display device can display the power adapter warning message, in some situations, the brightness of the display screen backlight may be minimized, the processing and/or memory system may be throttled, and/or other power consumption reduction actions may be performed such that the power from the power adapter device may be used to display the power adapter warning message on the display device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power adapter warning system, comprising:
  a power adapter device;
  at least one peripheral device; and
  a computing device that includes a display screen and that is coupled to the power adapter device and the at least one peripheral device, wherein the computing device is configured to:
    initialize and, in response, detect the power adapter device;

determine that the power adapter device does not provide sufficient power to complete a boot process and, in response;
throttle a processing system in the computing device; and
prevent power from being provided to the at least one peripheral device; and
perform the boot process such that the display screen is available for displaying information; and
provide a power adapter warning message for display on the display screen.

2. The power adapter warning system of claim 1, wherein the computing device is configured to:
determine that the power adapter device does not provide sufficient power to complete the boot process and, in response, reduce power provided to the display screen.

3. The power adapter warning system of claim 1, wherein the at least one peripheral device is coupled to the computing device through at least one Universal Serial Bus (USB) connector, and wherein the preventing power from being provided to the at least one peripheral device includes disabling power from being supplied through the at least one USB connector.

4. The power adapter warning system of claim 1, wherein the performing the boot process such that the display screen is available for displaying information includes performing the boot process to access a disk operating system provided on the computing device.

5. The power adapter warning system of claim 1, wherein the performing the boot process such that the display screen is available for displaying information includes performing the boot process to access a runtime operating system provided on the computing device.

6. An Information Handling System (IHS), comprising:
at least one peripheral device connector that is configured to couple to at least one peripheral device;
a power adapter connector that is configured to couple to a power adapter device;
a processing system coupled to each of the at least one peripheral device connector and the power adapter connector; and
a memory system that includes instructions that, when executed by the processing system, cause the processing system to provide a power adapter warning engine that is configured to:
initialize and, in response, detect the power adapter device coupled to the power adapter connector;
determine that the power adapter device does not provide sufficient power to complete a boot process and, in response;
throttle the processing system; and
prevent power from being provided to the at least one peripheral device connector; and
perform the boot process such that a display device is available for displaying information; and
provide a power adapter warning message for display on the display device.

7. The IHS of claim 6, wherein the power adapter warning engine is configured to:
determine that the power adapter device does not provide sufficient power to complete the boot process and, in response, reduce power provided to the display device.

8. The IHS of claim 6, wherein the at least one peripheral device connector includes at least one Universal Serial Bus (USB) connector, and wherein the preventing power from being provided to the at least one peripheral device connector includes disabling power from being supplied through the at least one USB connector.

9. The IHS of claim 6, wherein the performing the boot process such that the display device is available for displaying information includes performing the boot process to access a disk operating system.

10. The IHS of claim 6, wherein the performing the boot process such that the display device is available for displaying information includes performing the boot process to access a runtime operating system.

11. The IHS of claim 6, wherein the power adapter warning engine is configured to:
determine that completing the boot process using the power adapter device requires both the preventing of power from being provided to the at least one peripheral device connector and the throttling of the processing system.

12. A method for providing power adapter warnings, comprising:
initializing, by a computing device and, in response, detecting a power adapter device coupled to a power adapter connector on the computing device;
determining, by the computing device, that the power adapter device does not provide sufficient power to complete a boot process and, in response;
throttling a processing system in the computing device; and
preventing power from being provided to at least one peripheral device connector on the computing device; and
performing, by the computing device, the boot process such that a display device coupled the computing device is available for displaying information; and
providing, by the computing device, a power adapter warning message for display on the display device.

13. The method of claim 12, further comprising:
determining, by the computing device, that the power adapter device does not provide sufficient power to complete the boot process and, in response, reducing power provided to the display device.

14. The method of claim 12, wherein the at least one peripheral device connector includes at least one Universal Serial Bus (USB) connector, and wherein the preventing power from being provided to the at least one peripheral device connector includes disabling power from being supplied through the at least one USB connector.

15. The method of claim 12, wherein the performing the boot process such that the display device is available for displaying information includes performing the boot process to access a disk operating system.

16. The method of claim 12, wherein the performing the boot process such that the display device is available for displaying information includes performing the boot process to access a runtime operating system.

17. The method of claim 12, further comprising:
determining, by the computing device, that completing the boot process using the power adapter device requires both the preventing of power from being provided to the at least one peripheral device connector and the throttling of the processing system.

* * * * *